Oct. 16, 1962  E. P. AGHNIDES  3,058,158
MOLD FOR PLASTIC PERFORATED DIAPHRAGMS
Original Filed Aug. 4, 1959

INVENTOR
Elie P. Aghnides

BY Moore, Hall & Pollock

ATTORNEYS

United States Patent Office 3,058,158
Patented Oct. 16, 1962

3,058,158
MOLD FOR PLASTIC PERFORATED DIAPHRAGMS
Elie P. Aghnides, 46 W. 54th St., New York, N.Y.
Original application Aug. 4, 1959, Ser. No. 831,588, now Patent No. 2,998,931, dated Sept. 5, 1961. Divided and this application July 27, 1961, Ser. No. 134,557
8 Claims. (Cl. 18—42)

This invention relates to molds for producing perforated plastic diaphragms for devices for aerating water.

An object of the invention is to provide an improved mold for efficiently manufacturing perforate plastic disks for faucet aerators. The invention may be applied to permanent and integral faucet constructions as well as to attachments for existing faucets.

These and other novel features of the invention will be better understood by considering the following detailed description and by reference to the accompanying drawings, in which.

Figure 1:
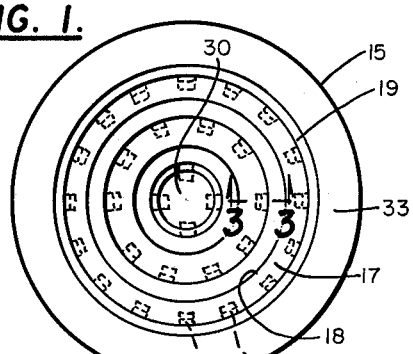
FIGURE 1 is a top view of the plastic perforate disk member for an aerator.
Figure 3:
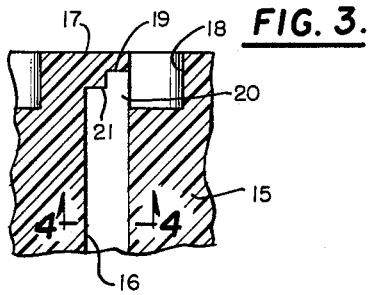
FIGURE 3 is a vertical cross-sectional detail of a portion of said disk member as viewed in section 3—3 of FIGURE 1.

One form of plastic perforated disc to be molded according to the invention is shown at 15 in FIGURE 1.

In practice, the disk 15 may include three substantially concentric rows of passageways or perforations 16, and the two radially outermost annular ribs 17 on the upstream surface of disk 15 are disposed so that they cover and partially close the inlet ends of the perforations 16 of the two radially outermost concentric rows. The innermost row of perforations 16 have their entrance openings 20 extending into the sides of pin 30, as shown in FIGURE 1, or alternatively may extend into an innermost rib (not shown), adjacent pin 30.

Figure 5:
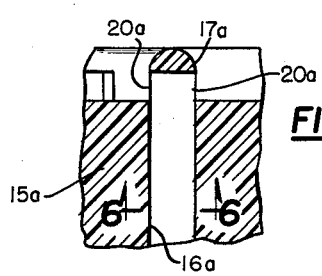
FIGURE 5 is a vertical cross-sectional detail view illustrating a portion of a further improved plastic perforated disk member constructed in a modified form in accordance with the present invention.

Another embodiment of the present invention is shown in FIGURE 5, this form of the invention comprising a disk 15a formed with a plurality of concentric rows of perforations or passageways 16a extending therethrough, and further provided with a plurality of concentric annular ribs 17a disposed to cover the rows of perforations 16a at their upstream ends. In this construction the annular ribs 17a are of the same width as the passageways 16a, the latter projecting into the ribs 17a a substantial portion of the height of the ribs, providing opposed openings 20a in each side of the ribs where the passageways 17a intersect and are coincident with the radially inner and outer side walls of the ribs. As a result, jet streams of water entering the passageways 16a from both sides of each annular rib 17a, impinge upon each other thereby creating an extensive turbulence so that the water issues from the passageways 16a into the aeration chamber in the form of streamlets having greatly impaired coherence. As illustrated in FIGURE 5, the upstream surfaces of the ribs 17a may be beveled or rounded for streamline flow of water into openings 20a in the sides of the ribs.

The disc 15a may have one or more circular rows of holes 16a. In either case the holes 16a may be elongated so as to extend toward the neighboring holes 16a of the same circular row; and indeed if the parts are suitably supported the holes 16a may be elongated to such extent that they joint together forming a narrow circular opening. Moreover, two or more holes of a given row may be joined to form an elongated slot. In the modifications suggested in this paragraph, ribs 17a and opposed openings 20a remain unchanged.

Figure 7:
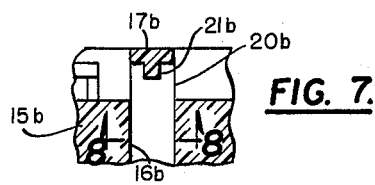
FIGURE 7 is a vertical cross-sectional detail view illustrating still another form of perforate disk member constructed in accordance with the present invention.
Figure 8:
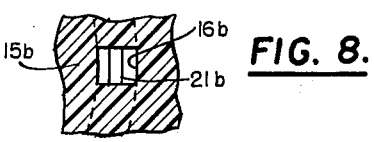
FIGURE 8 is a transverse cross-sectional detail view taken on line 8—8 of FIGURE 7.

In still another embodiments of the invention, illustrated in FIGURES 7 and 8, the disk 15b is formed with a plurality of concentric rows of passageways or perforations 16b, the upstream ends of which extend partially into annular ribs 17b, each passageway 16b having its upstream sides coincident with the opposite side walls of the respective ribs into which it projects, providing opposed openings 20b in each side of the ribs adjacent the passageways, is similarly to the form of the invention shown in FIGURE 5. In this embodiment, however, the upstream end of the passageway is formed with a pair of opposed steps 21b whereby water forced through the opposed openings 20b of each passageway is given added turbulence by the stepped construction so that the jet streams of water passing over the stepped construction impinge upon each other thereby creating added turbulence with the result that the jet stream then entering the aeration chamber will be further broken up into streamlets of more greatly impaired coherence. The upstream surfaces of ribs 17b may be beveled or rounded for streamlining the flow of water around the annular ribs and into openings 20b in the sides of the ribs.

In each of the embodiments of the invention, the preferred shape of passageways 16, 16a, and 16b is shown as cross-sectionally substantially square, trapezoidal or rectangular, the radially outer surfaces of the passageways being on the same curvature as the radially outer surfaces of the annular ribs, so that the ends of the passageways which project into the ribs are coincident with the side surfaces of the ribs, leaving clear openings in the sides of the ribs. In the form of the invention shown in FIGURES 5 and 7 the radially inner surfaces of the passageways are similarly on the same curvature as the radially inner surfaces of the annular ribs.

Optimum conditions or aeration and coherence of the issuing stream of water may be determined by experimenting with different sizes of passageways 16, different thicknesses of disk 15 and different dimensions for the entrance opening 20 and stop 21. These dimensions are found to vary with the diameter and longitudinal dimension of the aeration chamber 32 and spacing of screens 22 and 23, as well as the size of wire and mesh of the screen.

Figure 2:
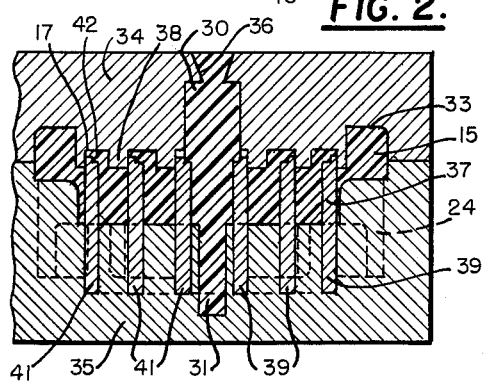
FIGURE 2 is a cross-sectional view of mold sections showing the disk member of FIGURE 1 as it appears in its molding cavity.
Figure 4:
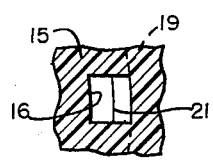
FIGURE 4 is a transverse cross-sectional detail view of the portion of the disk member taken on the line 4—4 of FIGURE 3.

The plastic disk member 15 may be injection molded in a mold as shown in FIGURE 2 in which an upper mold section 34 meets with a lower mold section 35 to define a cavity of the same shape as the disk member to be molded therein. A sprue 36 is formed in the mold wall, preferably communicating with the portion of the cavity for molding projection 30. The sprue is formed with a reverse draft formed by outwardly flaring surfaces, so that when the mold is parted for extraction of the plastic disk member, the plastic material at the top margin of the projection 30 will be broken off.

The mold cavity may be filled by injection molding therein in a manner well-known in the art, through sprue 36, a molten plastic molding material, such as polyethylene or a copolymer of vinyl and vinylidene chlorides. These plastic materials are preferred compositions in view of their toughness, elasticity, ease of accurate molding, ability to form a good seal with metallic surfaces with which they come into contact, and their ability to withstand corrosion and to resist the building up thereon of scale, such as normally forms on surfaces exposed to flow of hot water. A number of other plastic compositions are suitable, however, for use in disk member 15, for example, phenolic resins, nylon and other thermosetting and thermoplastic materials which have a sufficiently high softening point as not to be unduly softened by contact with hot water at the temperature at which the aerator is to be subjected.

In the molding of plastic products heretofore manufactured by means of molding operations in which a pin is employed to form a passageway or other aperture through the plastic material, it has been the practice to have the end of the pin abut flush against the surface of the mating mold member, or to project into a tight fitting socket or recess in the mating mold member. In the use of the abutting mold surfaces, a flash is usually formed between the end of the pin and the mating mold surface. This requires an additional operation for the removal of flash where the same is detrimental to the utility of the product as in the present case. In the prior art example where the pins extend into recesses, the pins, becoming displaced or distorted by pressure and handling of the mold, soon lose the super-accuracy required for molding minutely detailed tight fitting parts, and as soon as a pin becomes bent, it will break instead of entering its tight fitting recess. In the present case, the pins 37 for molding passageways 16, 16a or 16b, project into, but not entirely through, annular cavities or grooves 42 in the mold designed to produce annular ribs 17, 17a or 17b; thus the free space around the ends of the pins avoids the need for super-accuracy and eliminates pin breakage. Furthermore, the wiping and wedging contact between the sides of pins 37 and the sides of ribs 38 in the mold for molding the annular grooves between annular ribs 17, prevents the formation of any flash in the openings between passageways 16 and said annular grooves at the sides of ribs 17.

As shown in FIGURES 1 to 10 inclusive, passageways 16, 16a and 16b may be uniform in width both laterally and radially. In some instances it has been found advisable, however, to flare these passageways outwardly in a downstream direction, to increase turbulence of the jet streams of water passing therethrough for the purpose of more greatly impairing their coherence and incorporating a greater quantity of air mixed with the water in the aeration chamber. A detail of a mold and portion of a diaphragm embodying this modification is shown in FIGURE 12, in which the upper mold section 34c is formed with an annular groove 42c into which the uniform end section 44 of pin 37c projects part way. The passageway molding pin 37c is then tapered outwardly toward lower mold section 35c to provide a flared passageway 16c in diaphragm 15c. The flared side 45 may be on a radial side or both radial sides of the passageway 16c and may be on one or both lateral sides of said passageway (not shown). Corresponding sides of pin 37c will be provided with a beveled surface 46 to form such flared passageway 16c to produce a divergence of the issuing streamlets of water.

Figure 9:
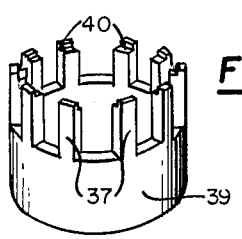
FIGURE 9 is a perspective detail illustrating a method of making the pin portion of the mold.
Figure 6:
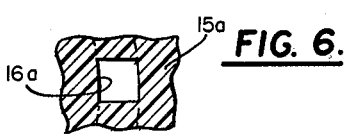
FIGURE 6 is a transverse cross-sectional detail view taken on line 6—6 of FIGURE 5.

An efficient manner of manufacturing the mold sections 34 and 35 is accomplished by machining grooves and recesses in the mold sections, as illustrated, the pins 37 being machined in the ends of the tubular sections 39. The form of pins 37 employed for molding passageways 16, as shown in FIGURES 1 to 6 inclusive, are formed on their ends with steps 40. The pins for molding passageways 16b, FIGURE 9, are similarly formed with pairs of steps or slots in the ends of the pins (not shown). The tubular members 39 with pins 37 machined on one end are then press-fitted into grooves 41 in the lower section 35 of the mold, different diameters of tubular members 39 being fitted into concentric grooves 41 of corresponding diameters to provide the concentric rows of pins 39 in the mold, and corresponding concentric rows of perforations or passageways 16, 16a, 16b or 16c in respective disks 15, 15a, 15b and 15c.

Figure 10:
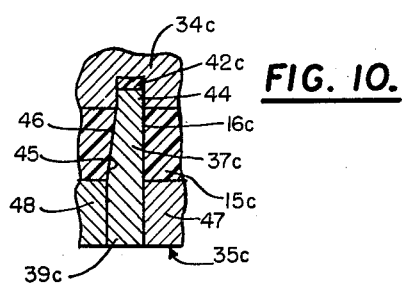
FIGURE 10 is a sectional detail of a modified form of mold and disk member therein.

In the form of the invention shown in FIGURE 10, pins 37c for producing flared passageway 16c are formed in the end of a tubular member 39c having a beveled portion for molding beveled surface 46. The continuous end of tubular member 39c may be force-fitted into a groove (not shown) in lower mold section 35c, or as shown in FIGURE 10 the lower mold section may be made up of a plurality of tightly fitting tubular ring members 47, 39c, 48, etc. This system may also be employed in the building up of the lower mold section 35 if so desired.

It will be seen that, in accordance with this invention, the novel and improved faucet aerator has been constructed for producing a soft, continuous, coherent, bubbly, oxygenated stream of water emerging from the aerator, resulting from greater turbulence and finer division of water particles in the jet streams of water passing through the novel type of perforated disk. The new and improved design of molded plastic disk affords added advantages in the facility of accurate and economical production; the avoidance of corrosion and scale formation; and the facility for cleaning out any foreign particles deposited from the water. The novel combination of lateral passageways extending vertically in the periphery of the disk and the downwardly directed openings in the periphery of the casing in communication with the lateral passageways, provided a construction which will still direct the stream of water downwardly in the event the downstream screens are clogged, whereas other types of aerators having laterally extending air-inlet openings, will direct streams of water laterally if the streams below the air and water mixing chamber become clogged with foreign matter. The new method of molding the perforated plastic disk, whereby the perforation molding pins in one mold section, extend into grooves in the opposing mold section, with the ends of the pins and two or three sides of the pins free of contact with the opposing mold section, affords a novel economical molding process avoiding the production of flash at the ends of the perforations and the accompanying additional labor of removing such flash. The improved mold also embodies the novel feature of providing concentric annular rows of perforation-forming pins having substantially square, trapezoidal or rectangular cross-sections, wherein the pins are produced on the ends of tubular members, the latter then being fitted into grooves in the molds. By providing perforation-molding pins having a substantially square, trapezoidal or rectangular cross-section, the pins can be formed as segments of annuli with the radially inner or outer segmental annular surface of a pin projecting from one mold section coincidentally contacting the side of an annular groove or rib of the same radius in the opposed mold section, to mold clear openings free of flash.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

This application for patent is a division of my copending application S.N. 831,588 filed August 4, 1959, now U.S. Patent No. 2,998,931 granted September 5, 1961, for Faucet Aerators.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

The foregoing new and inventive features of construction are defined in the appended claims.

I claim:

1. A mold for molding plastic perforated diaphragms of the type used in water faucet aerators, comprising relatively upper and lower mold sections enclosing a cylindrical molding cavity, concentric annular ribs and a groove therebetween in the cavity surface of said upper mold section for molding complementary annular grooves and a rib in the relatively upper surface of said diaphragm, perforation forming pins having an arcuate sector-shaped form and being substantially rectangular in cross-section, arranged in an annular row in said lower mold section concentrically and axially alined with the groove in said upper mold section, said pins projecting partially into said annular groove in the upper mold section with the upper ends of said annular row of pins formed with a central concentric slot for molding radially inner and outer steps at the ends of said perforations molded in said annular rib in the upper surface of said diaphragm, said pins having a radial width the same as the radial width of said groove and having their radially inner and radially outer arcuate boundaries in tight contact laterally with the respective radially outer and radially inner sidewalls of said annular ribs in said upper mold section, the opposed contacting arcuate surfaces being adapted to mold opposed lateral orifices through the sides of said annular rib of said diaphragm, said orifices communicating with said perforations to form water passageways through said diaphragm, the tightly contacting lateral arcuate surfaces thereby eliminating any flash or overflow which would obstruct the perforations.

2. A mold for molding plastic perforated diaphragms of the type used in faucet aerators, comprising relatively upper and lower mold sections enclosing a cylindrical molding cavity, an annular groove and rib in the cavity surface of said upper mold section, perforation forming pins having an arcuate sector-shaped form and being substantially rectangular in cross-section arranged in an annular row in said lower mold section concentrically and axially alined with the groove in the upper mold section, said pins projecting partially into the annular groove in the upper mold section in overlapping engagement therewith, the overlapping ends of said pins having at least one arcuate boundary in tight contact laterally with a sidewall of said annular rib in said upper mold section, the upper ends of said pins being formed with a step on the side of the pin in contact with a sidewall of the groove in the upper mold section, the tightly laterally contacting arcuate surfaces of said rib and pins being adapted to mold lateral orifices through said diaphragm to communicate with said perforations, the stepped ends of the pins molding steps in the upper ends of the perforations adjacent said lateral orifices to provide a restricted throat in the perforations spaced from the contacting pin and groove surfaces, to eliminate flash in the throat of the perforations.

3. A mold for molding plastic perforated diaphragms of the type used in water faucet aerators comprising upper and lower mold sections enclosing a mold cavity, concentric annular ribs and a groove in the cavity surface of said upper mold section for molding complementary annular grooves and a rib in the relatively upper surface or said diaphragm, perforation forming pins having an arcuate sector-shaped form and being substantially rectangular in cross-section arranged in an annular row in said lower mold section concentrically with the groove in said upper mold section, said pins projecting partially into said annular groove in the upper mold section with the uper ends of said pins having a radial width the same as the radial width of said groove and having their radially inner and radially outer arcuate boundaries in tight contact laterally with the respective radially outer and radially inner sidewalls of said annular ribs in said upper mold section, the opposed contacting arcuate surfaces being adapted to mold opposed lateral orifices through the sides of said annular rib of said diaphragm, said orifices communicating with said perforations to form water passageways through said diaphragm, the tightly contacting lateral arcuate surfaces thereby eliminating any flash or overflow to obstruct the perforations through said diaphragm.

4. A mold for molding plastic perforated diaphragms of the type used in faucet aerators, comprising upper and lower mold sections enclosing a molding cavity, an annular groove and rib in the cavity surface of said upper mold section, perforation forming pins having an arcuate sector-shaped form and being substantially rectangular in cross-section arranged in an annular row in said lower mold section, said pins projecting partially into the annular groove in the upper mold section in overlapping engagement, the overlapping ends of said pins having at least one arcuate boundary in tight contact laterally with a sidewall of said annular rib in said upper mold section, the tightly laterally contacting arcuate surfaces of said ribs and pins being adapted to mold lateral orifices through said diaphragm to communicate with said perforations without any flash being formed to obstruct the perforations.

5. A mold for molding plastic perforated diaphragms of the type used in water faucet aerators, comprising relatively upper and lower mold sections enclosing a cylindrical molding cavity, concentric annular ribs and a groove therebetween in the cavity surface of said upper mold section for molding complementary annular grooves and a rib in the relatively upper surface of said diaphragm, perforation forming pins having an arcuate sector-shaped form and being substantially rectangular in cross-section, arranged in an annular row in said lower mold section concentrically and axially alined with the groove in said upper mold section, said pins projecting partially into said annular groove in the upper mold section, said pins each having at least one of its arcuate boundaries in tight contact radially with a sidewall of said annular groove in said upper mold section, the ends of each of said pins being formed with a step adjacent the contact area with the sidewall of said groove for molding a step at the ends of said perforations extending into said annular rib in the upper surface of said diaphragm, the contacting arcuate surfaces and steps in the ends of said pins being adapted to mold stepped orifices through the sides of said annular rib of said diaphragm, said orifices communicating with said perforations to form passageways through said diaphragm, with a restricted throat adjacent said step in the upper end of said perforations, the tightly contacting arcuate surfaces and stepped pin ends eliminating any formation of flash which would obstruct the perforations.

6. A mold for molding plastic perforated diaphragms of the type used in faucet aerators, comprising relatively upper and lower mold sections enclosing a cylindrical molding cavity, an annular groove in the cavity surface of said upper mold section to mold a rib in the top of said diaphragm, an annular groove in the cavity surface in said lower mold section concentrically and axially alined with the groove in the upper mold section, a tubular insert fitted into the groove in said lower mold section, an upper portion of said tubular insert being slotted to form an annular row of perforation forming pins in said molding cavity, said pins having an arcuate sector-shaped form and being substantially rectangular in cross-section, said pins projecting partially into the annular groove in the upper mold section in overlapping engagement with the side walls of said groove when said mold is closed, the overlapping ends of said pins having at least one arcuate boundary in tight contact laterally with an arcuate sidewall of said annular rib in said upper mold section, the upper ends of said pins being formed with a step on that side of the pin which is in contact with the sidewall of the groove in the upper mold section, the tightly laterally contacting arcuate surfaces of said groove sidewall and said pins being adapted to mold lateral orifices through said diaphragm to communicate with said perforations, the stepped ends of the pins molding steps in the upper ends of the perforations adjacent said lateral orifices to provide a restricted throat in the perforations spaced from the contacting pin and groove surfaces, to eliminate flash in the throat of the perforations.

7. A mold for molding plastic perforated diaphragms of the type used in water faucet aerators, comprising relatively upper and lower mold sections enclosing a cylindrical molding cavity, a concentric annular groove in the cavity surface of said upper mold section for molding a complementary annular rib in the relatively upper surface of said diaphragm, perforation forming pins having an arcuate sector-shaped form and being substantially rectangular in cross-section, said pins being formed in an annular row in the end of a tubular insert and arranged in a groove in said lower mold section concentrically and axially alined with the groove in said upper mold section, said pins projecting partially into said annular groove in the upper mold section when said mold is closed, said pins each having at least one of its arcuate boundaries in tight contact radially with a sidewall of said annular groove in said upper mold section, the ends of each of said pins being formed with a step adjacent the contact area with the sidewall of said groove for molding a step at the ends of said perforations extending into said annular rib in the upper surface of said diaphragm, the contacting arcuate surfaces and steps in the ends of said pins being adapted to mold stepped orifices through the sides of said annular rib of said diaphragm, said orifices communicating with said perforations to form passageways through said diaphragm, with a restricted throat adjacent said step in the upper end of said perforations, the tightly contacting arcuate surfaces and stepped pin ends eliminating any formation of flash which would obstruct the perforations.

8. A mold for molding plastic perforated diaphragms of the type used in water faucet aerators, comprising upper and lower mold sections enclosing a molding cavity for molding said diaphragms, an annular groove and rib in the cavity surface of said upper mold section, perforation forming pins having an arcuate sector-shaped form and being substantially rectangular in cross-section arranged in an annular row in said lower mold section, said pins projecting partially into the annular groove in the upper mold section in overlapping engagement, the overlapping ends of said pins having at least one arcuate boundary in tight contact laterally with a sidewall of said annular rib in said upper mold section, the tightly laterally contacting arcuate surfaces of said rib and pins being adapted to mold lateral orifices through said diaphragm to communicate with said perforations without any flash being formed to obstruct the perforations, said pins tapering outwardly from said groove contacting area toward said lower mold section to mold perforations which flare outwardly in a downstream direction to facilitate divergence of the jet streams formed by said perforations.

References Cited in the file of this patent

UNITED STATES PATENTS

| | | |
|---|---|---|
| 2,369,291 | Frank et al. | Feb. 13, 1945 |
| 2,415,395 | Ulrich | Feb. 4, 1947 |
| 2,477,368 | Gits | July 26, 1949 |
| 2,541,923 | Huxham | Feb. 13, 1951 |
| 2,890,490 | Morin | June 16, 1959 |